(12) United States Patent
Li

(10) Patent No.: US 8,309,881 B2
(45) Date of Patent: Nov. 13, 2012

(54) PORTABLE ENGRAVING SYSTEM

(76) Inventor: Tong Li, Haslett, MI (US)

( * ) Notice: Subject to any disclaimer, the term of this patent is extended or adjusted under 35 U.S.C. 154(b) by 428 days.

(21) Appl. No.: 12/727,347

(22) Filed: Mar. 19, 2010

(65) Prior Publication Data

US 2011/0174789 A1     Jul. 21, 2011

Related U.S. Application Data

(60) Provisional application No. 61/296,931, filed on Jan. 21, 2010.

(51) Int. Cl.
    *B23K 26/00* (2006.01)
(52) U.S. Cl. .................. 219/121.68; 219/82; 83/861
(58) Field of Classification Search ............ 219/121.68, 219/121.82; 83/861
See application file for complete search history.

(56) References Cited

U.S. PATENT DOCUMENTS

| | | | |
|---|---|---|---|
| 4,985,780 A * | 1/1991 | Garnier et al. .......... | 219/121.68 |
| 5,262,612 A * | 11/1993 | Momany et al. ........ | 219/121.67 |
| 5,275,098 A * | 1/1994 | Larson ................... | 101/123 |
| 5,672,285 A * | 9/1997 | Kondo et al. ........... | 219/121.78 |
| 5,904,867 A * | 5/1999 | Herke .................... | 219/121.6 |
| 6,388,228 B1 * | 5/2002 | Lai ........................ | 219/121.6 |
| 6,423,925 B1 * | 7/2002 | Sukhman et al. ....... | 219/121.6 |
| 6,424,670 B1 * | 7/2002 | Sukhman et al. ....... | 372/107 |
| 6,855,911 B1 * | 2/2005 | Lai ........................ | 219/121.86 |
| 6,881,924 B2 * | 4/2005 | Lai ........................ | 219/121.67 |
| 7,652,225 B2 * | 1/2010 | Fazeny .................. | 219/121.72 |
| 2005/0205537 A1 * | 9/2005 | Penz et al. .............. | 219/121.72 |
| 2009/0223944 A1 * | 9/2009 | Sukhman et al. ....... | 219/121.84 |
| 2010/0213180 A1 * | 8/2010 | Miller .................... | 219/121.69 |

* cited by examiner

*Primary Examiner* — Jarrett Stark
(74) *Attorney, Agent, or Firm* — Paparella & Associates, PC; Joseph A. Paparella

(57) ABSTRACT

A portable engraving system comprises an enclosure adapted to operably accommodate an engraving device, wherein the enclosure comprises an adjustment system. The adjustment system comprises one or more adjustable devices, and the adjustable devices are adapted to adjust a distance between the enclosure and a work surface thereby allowing adjustment of the distance between the enclosure and the work surface, whereby the enclosure is adjustable with respect to the work surface. The enclosure further comprises an opening wherein the engraving device is operably positioned thereto, whereby the work surface is accessible to the engraving device therethrough. The enclosure is positionable adjacent the work surface and operably disposed thereto.

49 Claims, 11 Drawing Sheets

PORTABLE ENGRAVING SYSTEM

CROSS REFERENCE TO RELATED APPLICATION

This application claims the benefit of the filing date of U.S. provisional application Ser. No. 61/296,931 entitled "PORTABLE ENGRAVING SYSTEM" which was filed on Jan. 21, 2010 and which is herein incorporated by reference.

BACKGROUND OF THE INVENTION

The present invention relates to engraving systems, and more particularly to portable engraving systems and methods thereof.

Present engraving systems typically include an enclosed interior work area. As such, and to be compatible with an engraving system, a work piece must be small enough and of a specific shape to fit within the enclosed work area of the engraving system. This limits the engraving system to a small amount of potential work pieces.

While larger engraving systems have been developed to overcome this problem, thereby allowing for larger work pieces to be utilized, these larger engraving systems are typically fixed, non-portable, or not easily moved. Further, these stationary systems are unable to be moved relative to the work piece.

Additionally, these prior art systems require adequate preparation of the work piece in order to properly position the work piece relative to the engraving device. As such, the work piece must be manually manipulated such that the engraved surface is positioned a fixed distance from the engraving device, the distance being set by the requirements of the specific engraving device. This manual manipulation or set-up of the work piece requires additional time and expense, as well as the expertise of an experienced operator.

Accordingly, a need exists for novel systems and methods which have, among other advantages: the ability to accommodate a wide variety (i.e., shapes, sizes, materials, and weights) of work pieces; the ability to be easily moved from one location to another; and the ability to reduce the expertise required for operation. Therefore, an engraving system that solves the aforementioned disadvantages and having the aforementioned advantage is desired.

SUMMARY OF THE PRESENT INVENTION

The aforementioned drawbacks and disadvantages of these former engraving systems have been identified and a solution is set forth herein by the inventive portable engraving system which comprises an enclosure adapted to operably accommodate an engraving device, wherein the enclosure comprises an adjustment system. The adjustment system comprises one or more adjustable devices, and the adjustable devices are adapted to adjust a distance between the enclosure and a work surface thereby allowing adjustment of the distance between the enclosure and the work surface, whereby the enclosure is adjustable with respect to the work surface. The enclosure further comprises an opening wherein the engraving device is operably positioned thereto, whereby the work surface is accessible to the engraving device therethrough. The enclosure is positionable adjacent the work surface and operably disposed thereto.

Another aspect of the present invention includes a portable engraving system comprising a portable enclosure adapted to operably accommodate an engraving device, wherein the enclosure comprises an adjustment system, and the adjustment system comprises one or more adjustable devices, wherein the adjustable devices are adapted to adjust a distance between the enclosure and a work surface of a work piece thereby allowing adjustment of the distance between the enclosure and the work surface whereby the enclosure is adjustable with respect to the work surface. The enclosure further comprises an opening wherein the engraving device is operably positioned thereto, and whereby the work surface is accessible to the engraving device therethrough. Also included is a portable base comprising an exhaust vent, wherein the base is adapted to removably receive the portable enclosure and further is adapted to retain the work piece, wherein when the enclosure is removably positioned on the base, the enclosure is disposed adjacent the work surface.

In another aspect of the present invention, a portable engraving system comprises a portable enclosure which is adapted to operably accommodate an engraving device. The enclosure further comprises an adjustment system, wherein the adjustment system comprises one or more adjustable devices, and the adjustable devices are adapted to adjust a space between the enclosure and a work surface of a work piece, thereby allowing adjustment of the space between the enclosure and the first work surface whereby the enclosure is adjustable with respect to the work surface. The enclosure further comprises an opening wherein the engraving device is operably positioned thereto, whereby the work surface is accessible to the engraving device therethrough. Also provided is a portable cart which is adapted to removably receive the portable enclosure, wherein the cart is adapted to be positionable over the work piece and positions the enclosure adjacent the work surface.

And still in another aspect of the present invention, a portable laser engraving system comprises a portable enclosure which is adapted to operably accommodate a laser engraving device. The enclosure comprises an adjustment system which is adapted to adjust a space between the enclosure and a work surface of a work piece thereby allowing adjustment of the space between the enclosure and the first work surface. The enclosure is adjustable with respect to the work surface and the adjustment system comprises four independently adjustable worm drives. The enclosure further comprises an opening wherein the engraving device is operably positioned thereto, whereby the work surface is accessible to the engraving device therethrough. Also provided is a portable cart which is adapted to removably receive the portable enclosure, wherein the cart is adapted to be positionable over the work piece and positions the enclosure adjacent the work surface. Further provided is a portable base comprising an exhaust vent, wherein the base is adapted to removably receive the portable enclosure and further adapted to retain the work piece. In this manner, the portable enclosure is adapted to be disposed on one of the portable cart and the portable base.

In yet another aspect of the present invention, a portable laser engraving system comprises a portable enclosure adapted to operably accommodate a laser engraving device wherein the enclosure comprises an adjustment system, the adjustment system comprising one or more independently adjustable devices, and the adjustable devices are adapted to independently adjust a distance between the enclosure and a work surface of a work piece, thereby allowing adjustment of the distance and angle between the enclosure and the work surface, whereby the enclosure is adjustable with respect to the work surface. The enclosure further comprises an opening, wherein the engraving device is operably positioned thereto, whereby the work surface is accessible to the engraving device therethrough.

In still another aspect of the present invention, a portable laser engraving system comprises a portable enclosure which is adapted to operably accommodate a laser engraving device. The enclosure comprises an adjustment system, and the adjustment system comprises four independently adjustable worm drives, thereby allowing adjustment of the distance and angle between the enclosure and the work surface, whereby the enclosure is adjustable with respect to the work surface. The enclosure further comprises an opening, wherein the engraving device is operably positioned thereto, whereby the work surface is accessible to the engraving device therethrough. The enclosure further comprises an exhaust system disposed on a top thereof. Also provided is a portable cart which is adapted to removably receive the portable enclosure, wherein the cart is adapted to be positionable over the work piece and positions the enclosure adjacent the work surface. The cart further comprises an adjustment system comprising one or more vertically adjustable devices, the adjustable devices adapted to adjust a distance between the cart and a work surface. Also provided is a portable base comprising an exhaust vent, wherein the base is adapted to removably receive the portable enclosure and further adapted to retain the work piece. The portable enclosure is adapted to be disposed on one of the portable cart and the portable base.

Yet still another aspect of the present invention, a portable engraving system comprises a portable enclosure adapted to operably accommodate an engraving device. the enclosure further comprises an adjustment system, wherein the adjustment system comprises one or more adjustable devices disposed on respective one or more outside surfaces of the enclosure. The adjustable devices are adapted to adjust a space between the enclosure and a work surface thereby allowing adjustment of the space between the enclosure and the work surface. The enclosure further comprises an exhaust system and the enclosure is positionable adjacent the work surface and adjustably disposed thereto.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To wit, the portable engraving system of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the portable engraving system of the present disclosure, its advantages, and the specific traits attained by its use, reference should be made to the accompanying drawings and other descriptive matter in which there are illustrated and described the preferred embodiments of the invention.

As such, while embodiments of the portable engraving system are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, eleven pages of drawings are disclosed with an informative, but not limiting, intention.

DETAILED DESCRIPTION OF THE PREFERRED EMBODIMENT

The best mode for carrying out the invention is presented in terms of the preferred embodiment, wherein similar referenced characters designate corresponding features throughout the several figures of the drawings.

Figure 1:
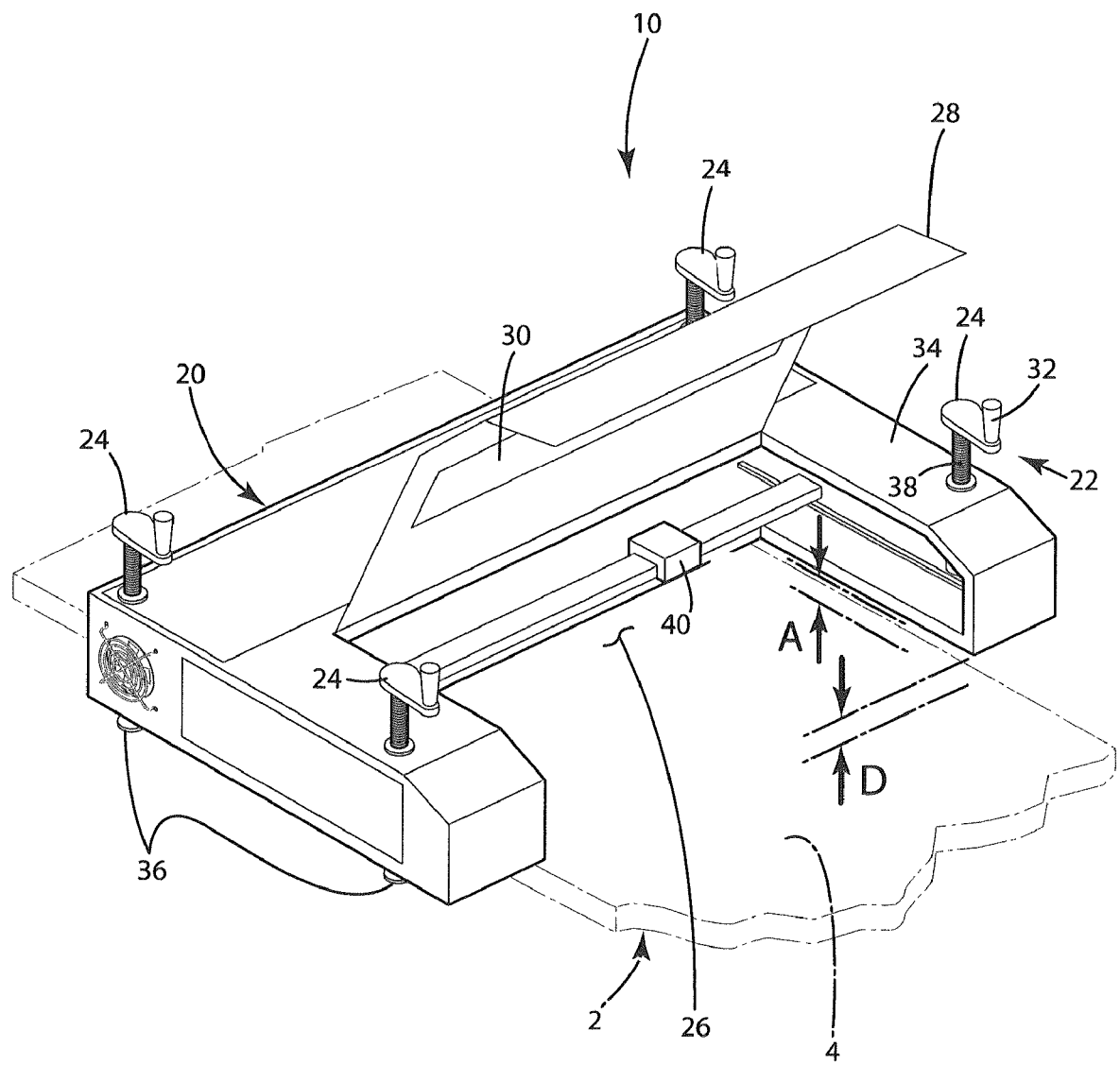
FIG. 1 is a perspective view of an embodiment of an enclosure of the portable engraving system of the present invention.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term portable is meant to be used and defined in its general and ordinary sense. To wit, easily or conveniently moved and transported; able to be used without attachment, fastening, or fixation to a surface (e.g., a ground surface); and generally non-permanent.

In a broader sense, existing engraving systems typically include an enclosed interior work area. As such, to be compatible with an engraving system a work piece must be small enough and of a specific shape to fit within the enclosed work area of the engraving system. This limits the engraving system to a small amount of potential work pieces.

On the other hand, while larger engraving systems have been developed to overcome this problem, thereby allowing for larger work pieces to be utilized, these larger engraving systems are rigidly (i.e., permanently) affixed to the ground, are not easily moved, and are therefore not portable. Further, these stationary systems are unable to be moved relative to the work piece.

Further, these prior art systems require adequate preparation of the work piece before the work piece can be engraved. This required set-up or work includes manually manipulating the work piece such that the engraved surface is positioned a fixed distance from the engraving device. This manual manipulation or set-up of the work piece requires additional time and expenses, as well as the expertise of an experienced operator.

Accordingly, a need exists for novel systems and methods which have, among other advantages: the ability to accommodate a wide variety (i.e., shapes, sizes, materials, and weights) of work pieces; the ability to be easily moved from one location to another; and the ability to reduce the expertise required for operation. Therefore, an engraving system that solves the aforementioned disadvantages and having the aforementioned advantages is disclosed herein.

The disadvantages and drawbacks of the prior art are overcome through the engraving system of the present invention, wherein one preferred embodiment is disclosed in FIG. 1. Referring now to FIG. 1, there is shown a portable engraving system 10 which comprises an enclosure 20 adapted to operably accommodate an engraving device 40. The enclosure 20 comprises an adjustment system 22, and the adjustment system 22 includes one or more adjustable devices 24. The adjustable devices 24 are adapted to adjust a distance D between the enclosure 20 and a work surface 4 of a work piece 2, thereby allowing adjustment of the distance between the enclosure 20 and the work surface 4, whereby the enclosure 20 is adjustable with respect to the work surface 4. The enclosure 20 further comprises an opening 26 wherein the engraving device 40 is operably positioned thereto, whereby the work surface 4 is accessible to the engraving device 40 therethrough. The enclosure 20 is portable and therefore positionable adjacent the work surface 4 and thereby operably disposed thereto.

As illustrated by FIG. 1, enclosure 20 may include an opening, door, cover, or other portal 28 for access thereto. For example, an articulated cover 28 is illustrated. In one embodiment of the invention, the cover 28 is moveable between a range of from a first closed position to a second open position. When in the first closed position, the cover 28 covers the engraving device 40 and the opening 26 such that the engraving device 40 and the opening 26 are housed within enclosure 20. For example, this may be required before operation of system 10 can commence; while when in the second open position, the engraving device 40 and the opening 26 are accessible. The cover 28 may further comprise a window 30 that may be transparent and visible therethrough whereby the operation of one or more of the elements of system 10 may be visible therethrough. The cover may be attached or articulated in any known manner.

Enclosure 20 further comprises opening 26. Opening 26 is operably disposed so as to provide engraving device 40 with access to work surface 4, whereby work surface 4 is accessible to engraving device 40 therethrough for engraving therein. Thus, as enclosure 20 is removably positionable adjacent work surface 4, opening 26 may thereby be operably disposed adjacent work surface 4 such that engraving device 40 may operate therethrough.

Enclosure 20 is adapted to operably accommodate an engraving device 40 for operation therein. The engraving device 40 may comprise any known device for etching, engraving, imprinting, or otherwise marking a surface 4 of a work piece 2. Of course, this is not meant to be limiting in any manner, and the engraving device 40 could also be used for cutting, welding, or other applications relative to a work piece disposed therein or thereunder. With respect to engraving, these known engraving devices may engrave the work piece in a number of manners including, inter alia: air; water; sand; knives; chisels; and lasers. The device described and illustrated herein may utilize a laser engraving device. For example a $CO_2$ (carbon dioxide) or a Nd YAG (neodymium-doped yttrium aluminium garnet; Nd:$Y_3Al_5O_{12}$) laser. Of course, this is not meant to be limiting in any manner and numerous other engraving devices may also be used. Further, the engraving device 40 may be adjustable to allow for adjustment of the distance between the engraving device and the work surface 4.

Adjustment system 22 may comprise one or more adjustable devices 24 which are adapted to adjust a distance D (e.g., a height) between the enclosure 20 and a first work surface 4 thereby allowing for independent adjustment of the distance between enclosure 20 and the work surface 4 such that the enclosure is adjustable with respect to the work surface. In one preferred embodiment, four vertically adjustable worm gears are positioned at 4 diagonally opposed positions (for example, the four corners of an otherwise rectangular enclosure), with adjustment controls 32 disposed and otherwise accessible from a top surface 34. In this embodiment, the four adjustable devices are independently adjustable to adjust the distance D between the enclosure and the work surface. In this manner, the height of enclosure 20 may be adjusted according to the particular requirements of the engraving device 40 and the work surface 4, while also allowing adjustment of the angle A between the work surface 4 and the enclosure 20. In this manner, the enclosure 20 can be adjusted to a uniform fixed distance (D) from a work surface that is angled (e.g., other than flat or horizontal) without the manual leveling of the work surface that is required by existing systems. In this embodiment, the adjustable devices 24 may also comprise a pedestal, base, or feet 36 which may be fixed or allow for movement (e.g., wheels), and a worm body or gear 38. The base 36 may be adapted to be disposed on the work surface 4, or an appropriate base or support (e.g., a floor surface, a base 60, and a cart 80), or in any other manner wherein work surface 4 is accessible to the engraving device 40 through the opening 26. In this particular embodiment, the adjustment control 32 may be moved, rotationally, causing the worm body 38 to rotate, thereby varying the distance D between the work surface 4 and enclosure 20. Each of the one or more adjustment devices 24 may be operated in this manner to allow for the proper spacing (D) as well as the proper angle (A) therebetween.

Of course, adjustment system 22 may comprise any known adjustment device or system and further, may be manually configured or automatically adjusted as is known in the art. Further, any number of adjustment devices may be used depending on the specifics of the enclosure 20 (e.g., three equidistant and radially oriented adjustment devices could be used on a circular enclosure in order to adjust the distance D and the angle A).

Figure 2:
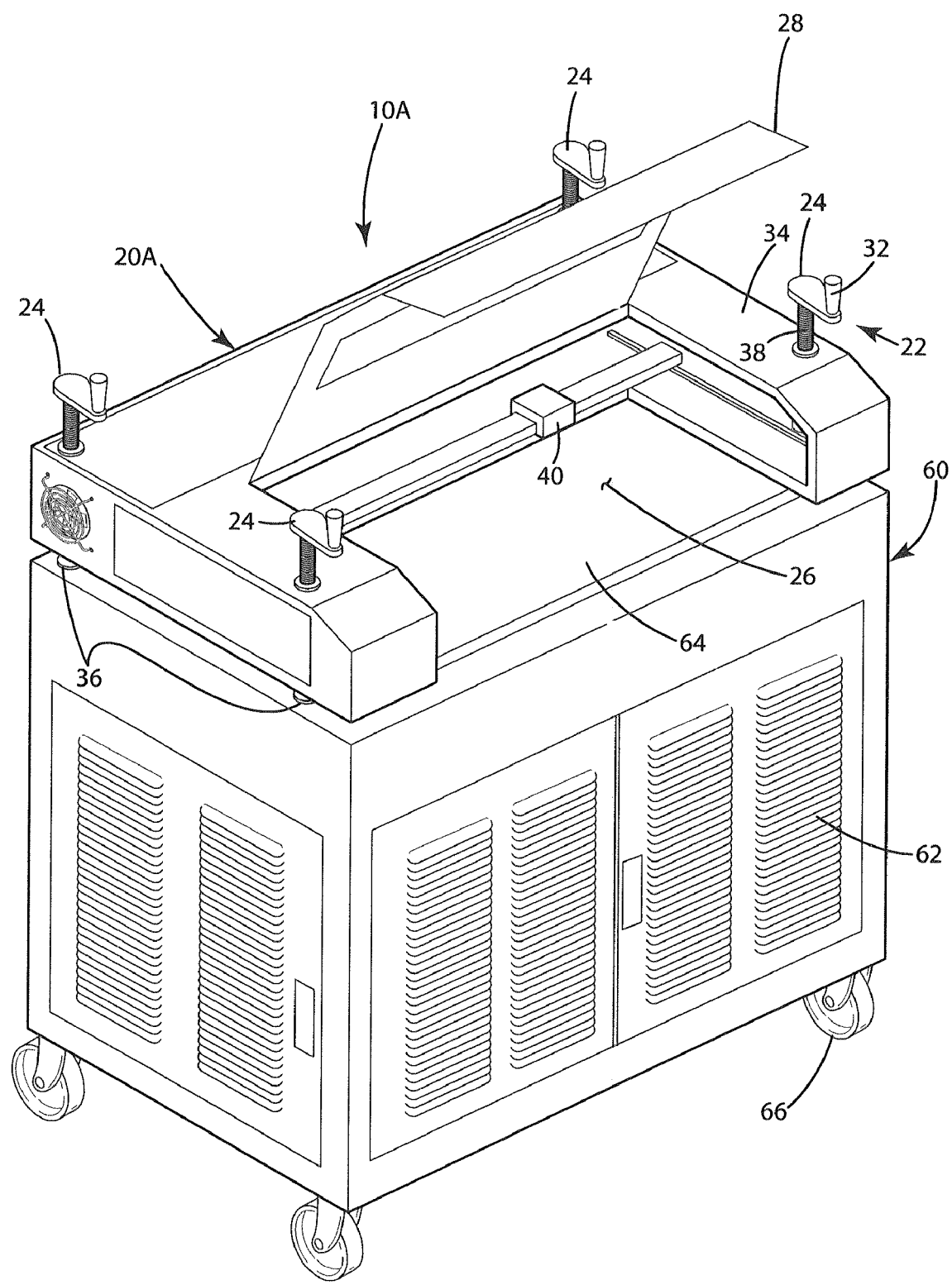
FIG. 2 is a perspective view of the enclosure of FIG. 1 disposed on an embodiment of a base of the portable engraving system of the present invention.

FIG. 2 illustrates another embodiment 10A, including an enclosure 20A which may be removably disposed on a portable base 60. Base 60 may further comprise an exhaust system 62, a work piece platform, base, or holder 64 which is adapted to retain work piece 2, and one or more pedestals, base, or feet 66. Exhaust system 62 may comprise any known exhaust system which allows for the removal of fumes and debris which are generated during the engraving operation, and which are to be removed or otherwise exhausted from the system 10A. Exhaust system 62 may be, for example, housed within the base 60. In one embodiment, base 60 includes four pedestals 66 which allow for movement of the base, and may comprise, for example, wheels.

Figure 3:
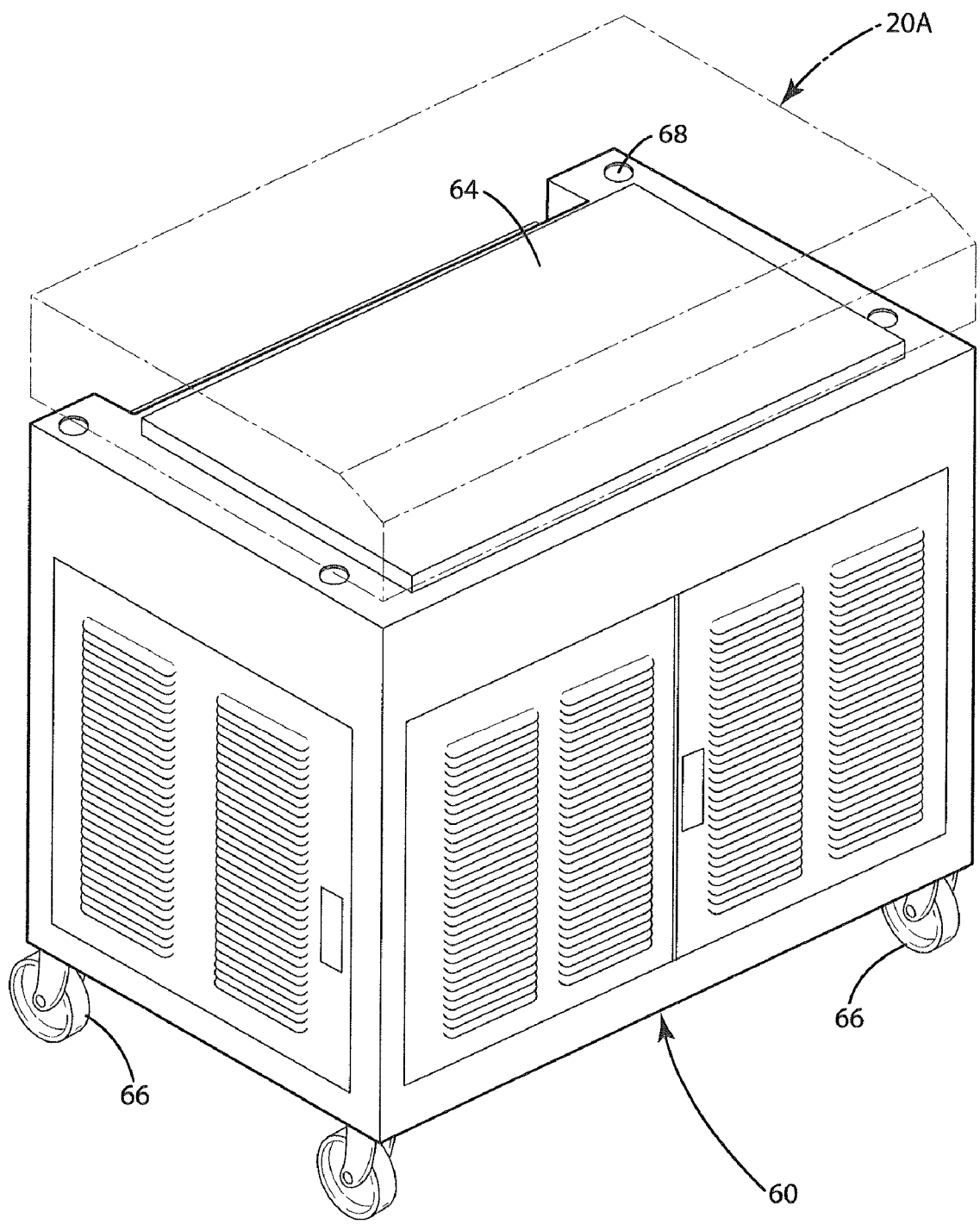
FIG. 3 is a perspective view of the base of FIG. 2

As illustrated in FIG. 3, enclosure 20A may be removably disposed on base 60, whereby the work piece 2 is positioned on platform 64 such that work surface 4 is adjacent opening 26 of the enclosure. In this manner, enclosure 20A is removably positioned adjacent (e.g., above) work surface 4 and the engraving operation may commence. Further, due to the portability of base 60 and the combined system is easily transportable and movable both within a particular location, as well as between locations. In the embodiment illustrated by FIG. 3, base 60 further comprises one or more holders 68 which are adapted to receive the one or more pedestals 36 of enclosure 20A.

Figure 4:
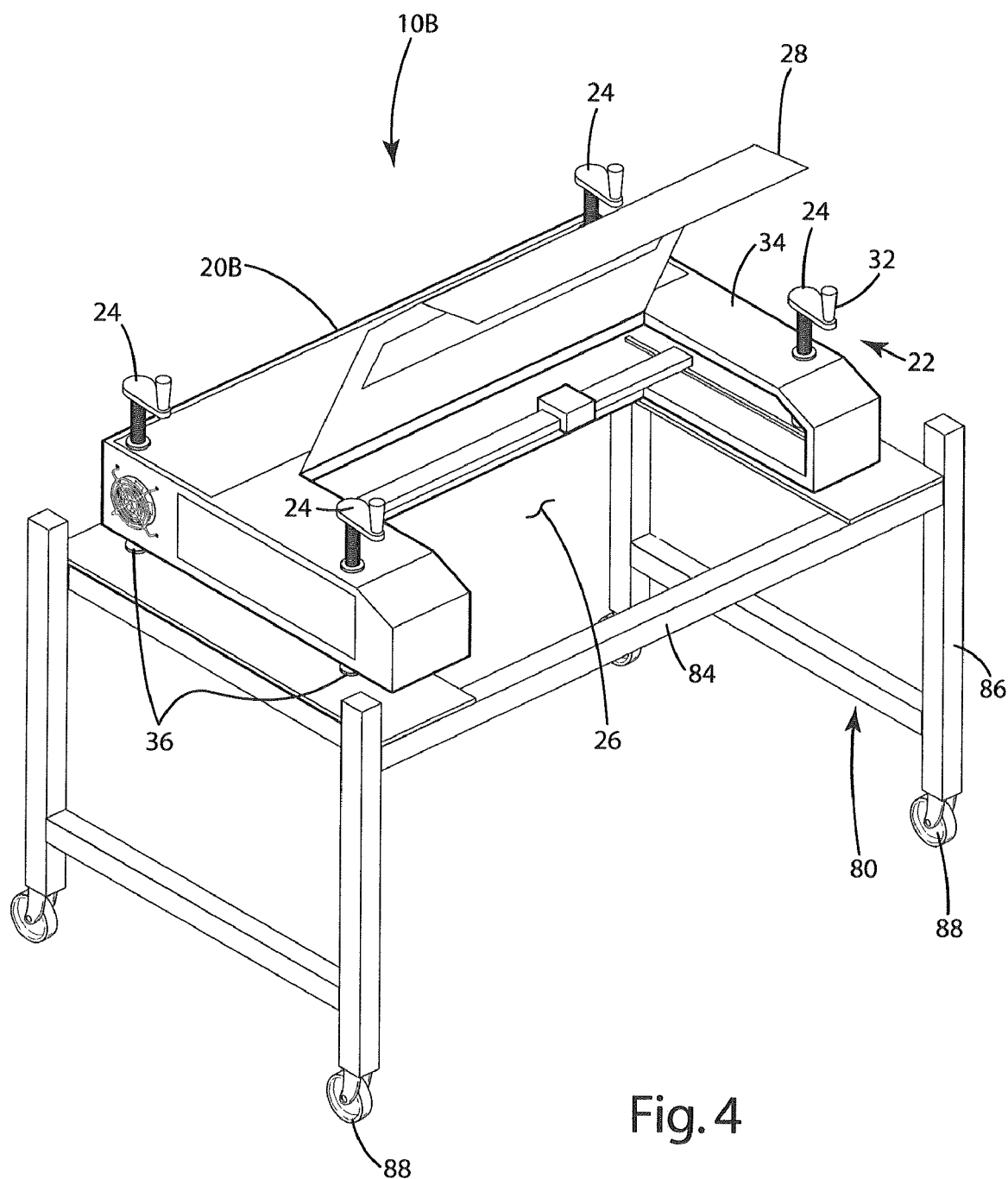
FIG. 4 is a perspective view of the enclosure of FIG. 1 disposed on an embodiment of a cart of the portable engraving system of the present invention.

FIG. 4 illustrates another embodiment 10B, including an enclosure 20B which may be removably disposed on a portable cart 80. The portable cart 80 may be adapted to removably receive the enclosure 20B, wherein the cart 80 is adapted to be positionable over the work piece 2 and positions the enclosure 20B adjacent the work surface 4. Portable cart 80 may include horizontal frame components 84 and vertical frame components 86. Cart 80 may also include a plurality of pedestals, base, or feet 88. In one embodiment, pedestals 88 comprise wheels.

Enclosure 20B may be removably disposed on cart 80, allowing work piece 2 to be positioned on a floor surface, cart, or other platform such that work surface 4 is adjacent opening 26 of the enclosure. This may be accomplished, for example, by disposing the work piece on a support surface, moving cart 80 thereabove, and adjusting enclosure 20B thereto. In this manner, enclosure 20B is removably positioned adjacent (e.g., above) work surface 4 and the engraving operation may commence. Further, due to the portability of cart 80 and the enclosure 20B, the combined system is easily transportable and movable both within a particular location, as well as therebetween. In one embodiment, cart 80 further comprises one or more holders (not shown) which are adapted to received the one or more pedestals 36 of enclosure 20B.

Figure 5:
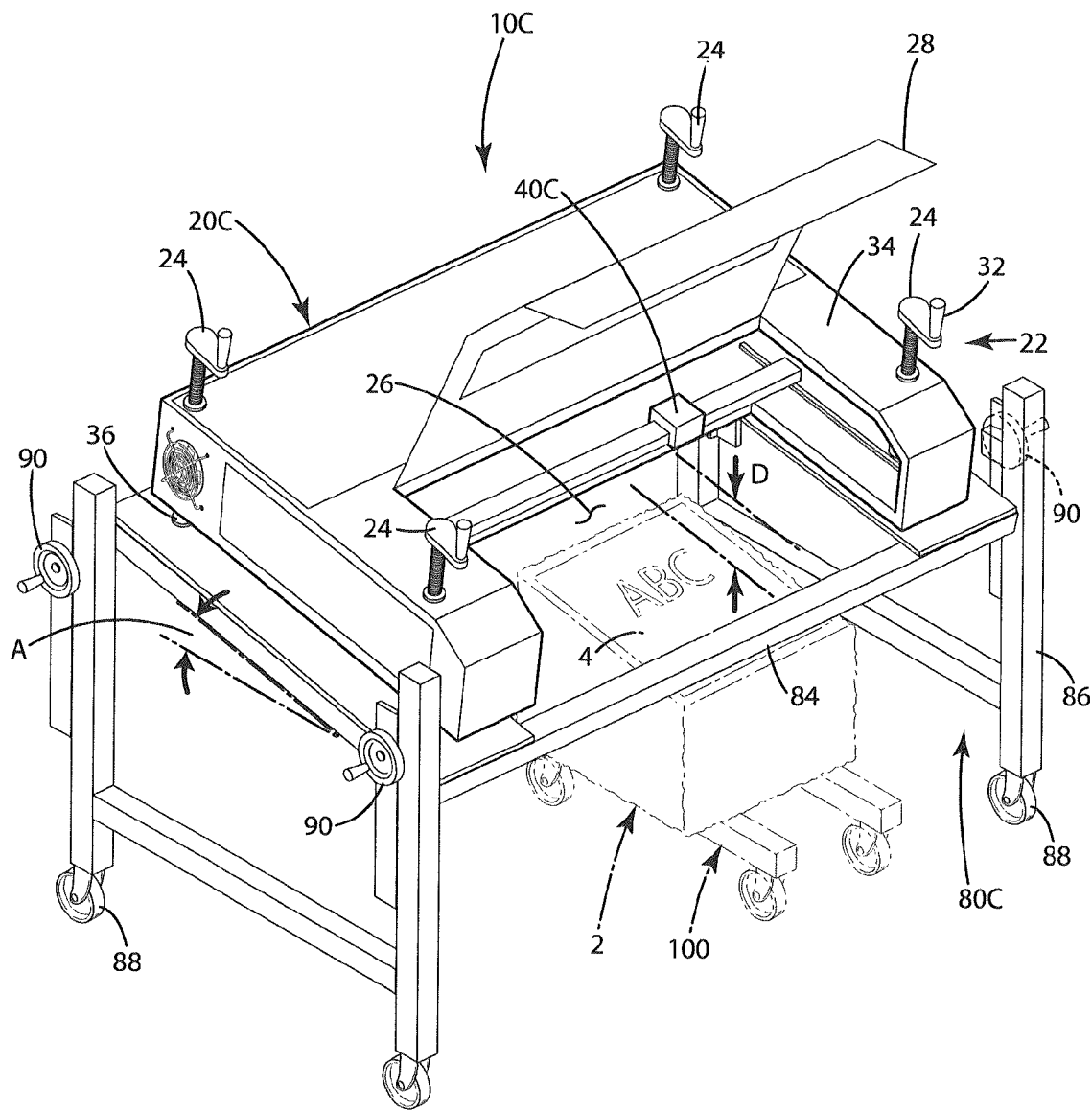
FIG. 5 is a perspective view of the enclosure of FIG. 1 disposed on an alternate embodiment of a cart of the portable engraving system of the present invention.

Further, as illustrated in FIG. 5, an embodiment 10C is illustrated and comprises an adjustable cart 80C which includes one or more adjustment devices 90 which allow for the adjustment of the height and angle of enclosure 20C relative to the work piece. In this embodiment, the combination of portable and adjustable cart 80C, and portable and adjustable enclosure 20C, allows for engraving over a work piece 2 having an irregular or angled surface. In this manner, the height of enclosure 20C may be adjusted according to the particular requirements of the engraving device 40C and the work surface 4, while also allowing adjustment of the angle A between the work surface 4 and the enclosure 20C. In this manner, the enclosure 20C can be adjusted to a uniform fixed distance (D) from a work surface that is angled (e.g., other than horizontal) without the manual leveling of the work surface that is required by existing systems.

Figure 6:
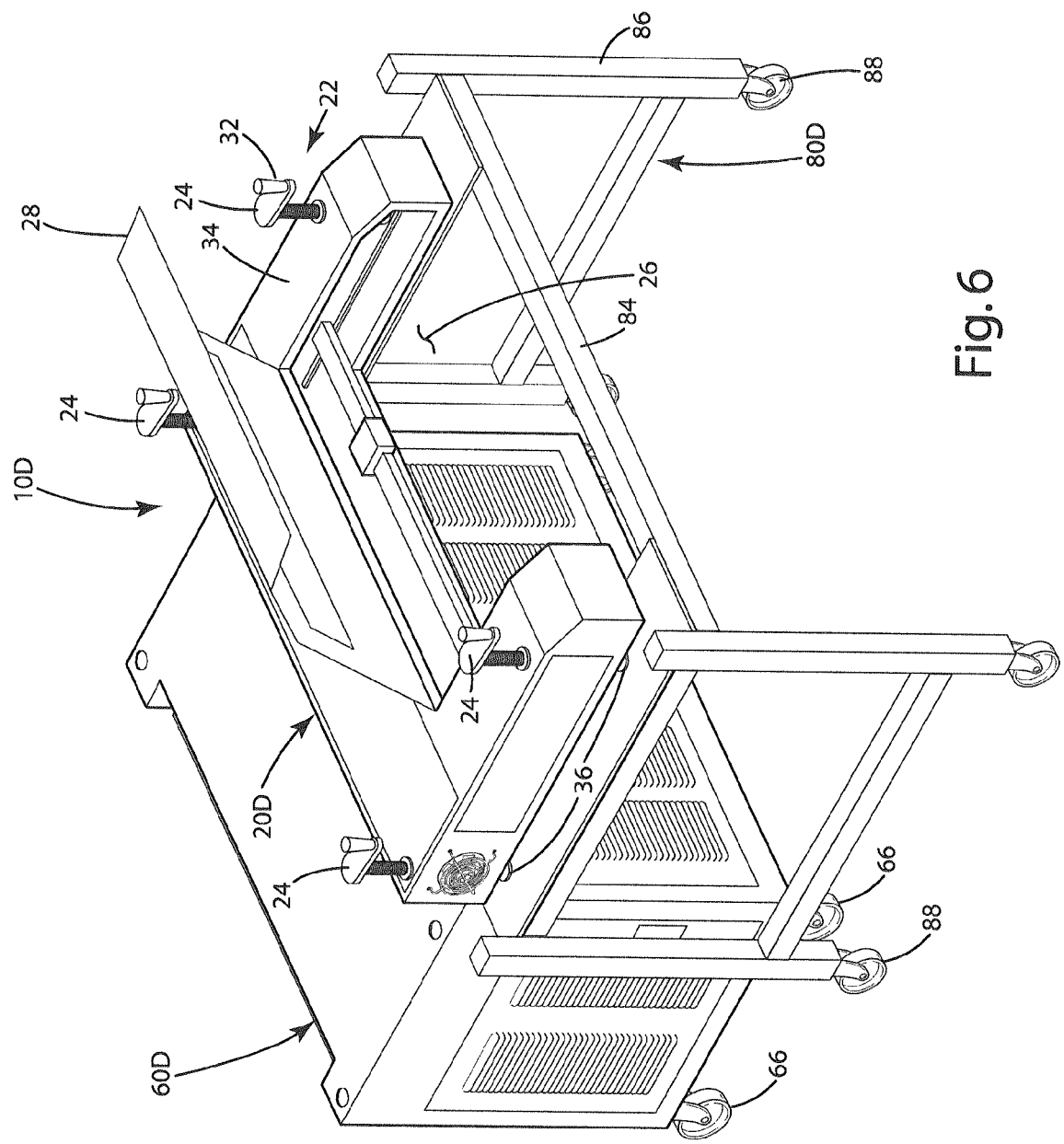
FIG. 6 is a perspective view of the enclosure of FIG. 1 disposed on an embodiment of the cart, in use with the base of the portable engraving system of the present invention.

As illustrated in FIG. 6, an embodiment 10D is shown and may include an enclosure 20D, a base 60D, and a cart 80D as described herein above. In this configuration, all of the advantages of enclosure 20D, base 60D, and cart 80D can be combined into a single portable and interchangeable system. For example, by positioning the work piece 2 (disposed on the ground or a cart 100) underneath portable cart 80D, the engraving operation may commence with the benefit of the venting provided by base 60D. Alternatively, the work piece 2 may be disposed directly on base 60D.

Figure 7:
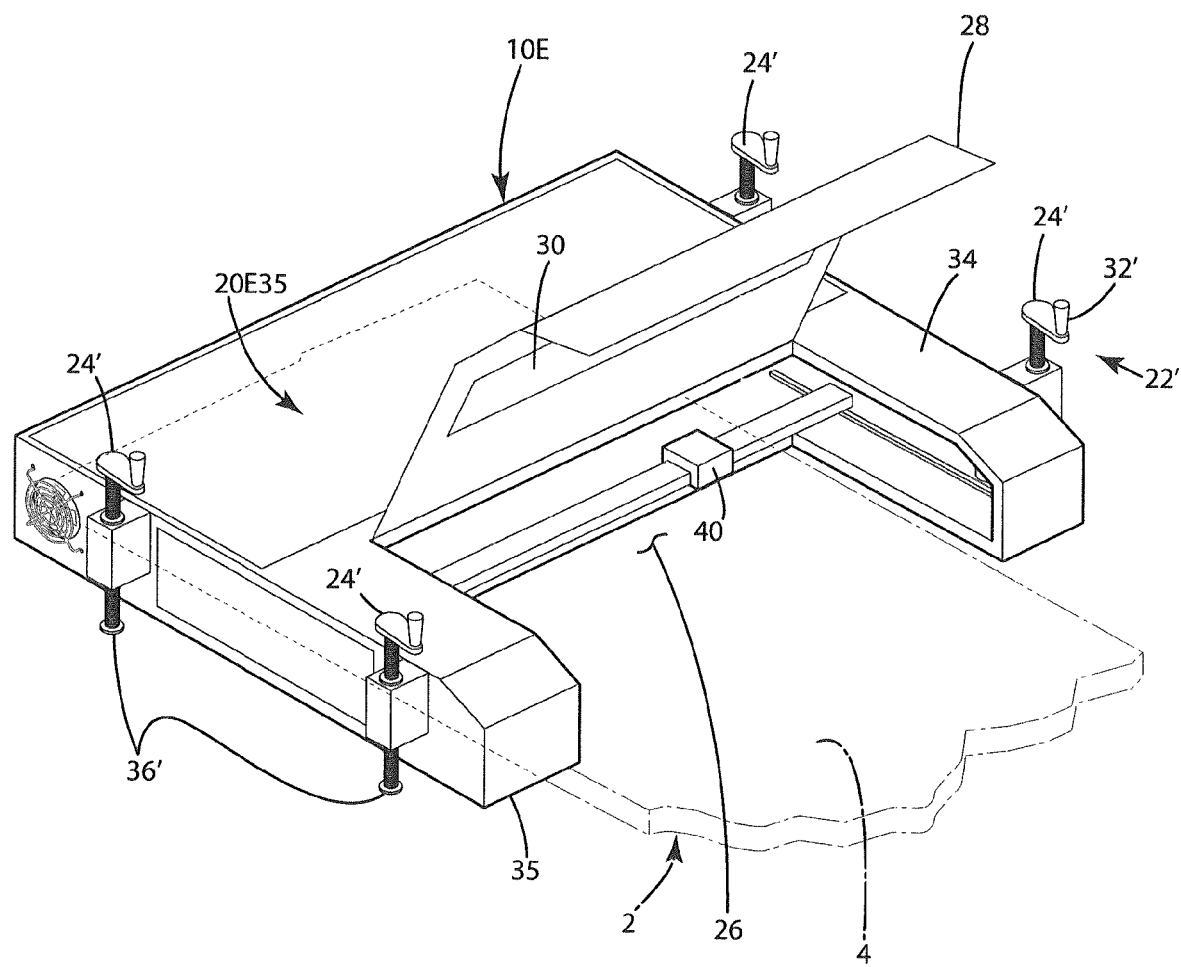
FIG. 7 is a perspective view of another embodiment of an enclosure of the portable engraving system of the present invention.

Illustrated in FIG. 7 is an alternate embodiment of the enclosure 10E. In this embodiment the adjustment system 22' comprises one or more adjustable devices 24' which are disposed outside of enclosure 20E. By positioning the one or more adjustable devices 24' outside of the enclosure, the one or more pedestals 36' are no longer constrained or restricted in adjustment by a bottom surface 35 of enclosure 20E. To wit, in this embodiment the enclosure may be adjusted so that the bottom surface 35 is below the pedestals 36', thereby allowing for yet further adjustability.

Figure 8:
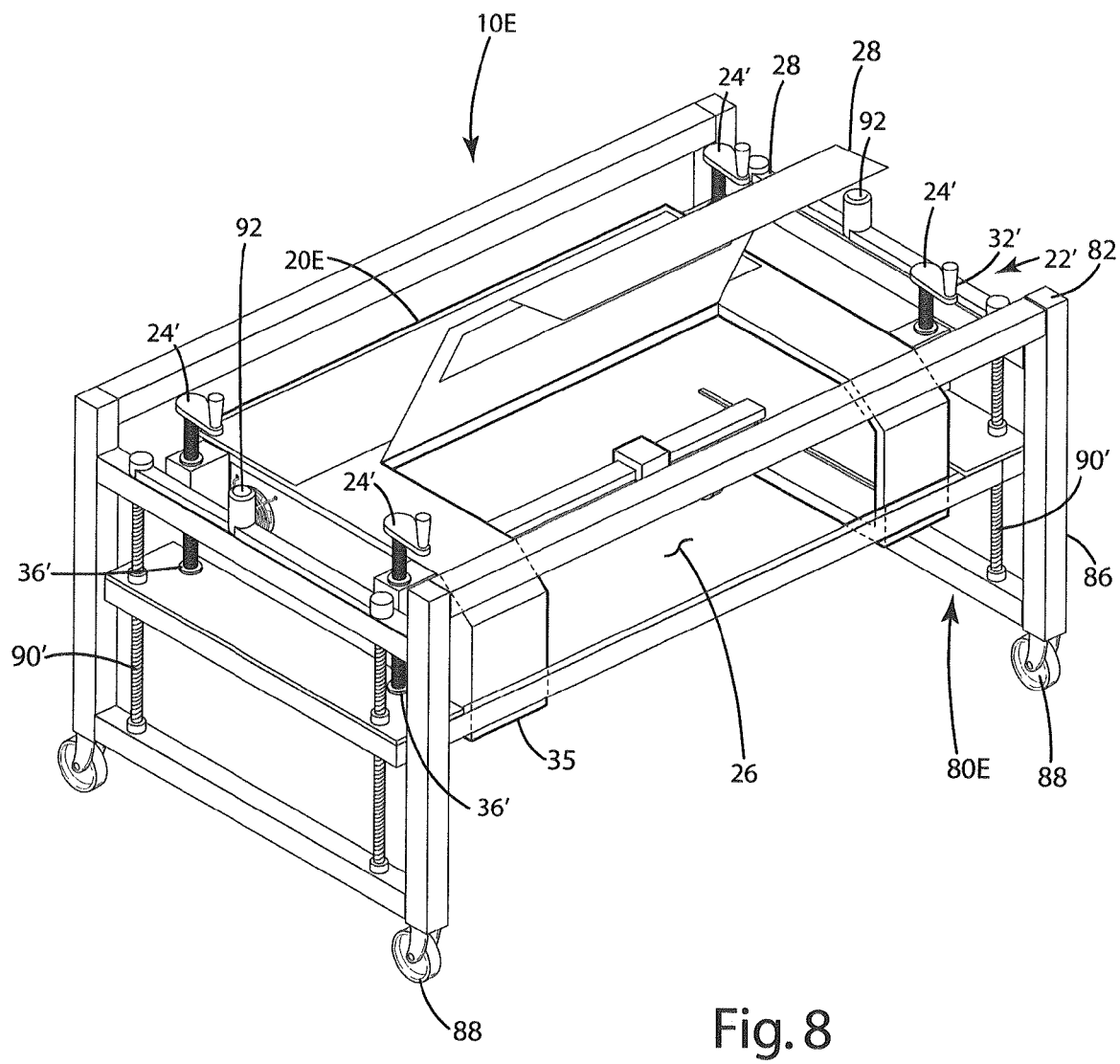
FIG. 8 is a perspective view of the enclosure of FIG. 7 disposed on an alternate embodiment of a cart of the portable engraving system of the present invention.
Figure 9:
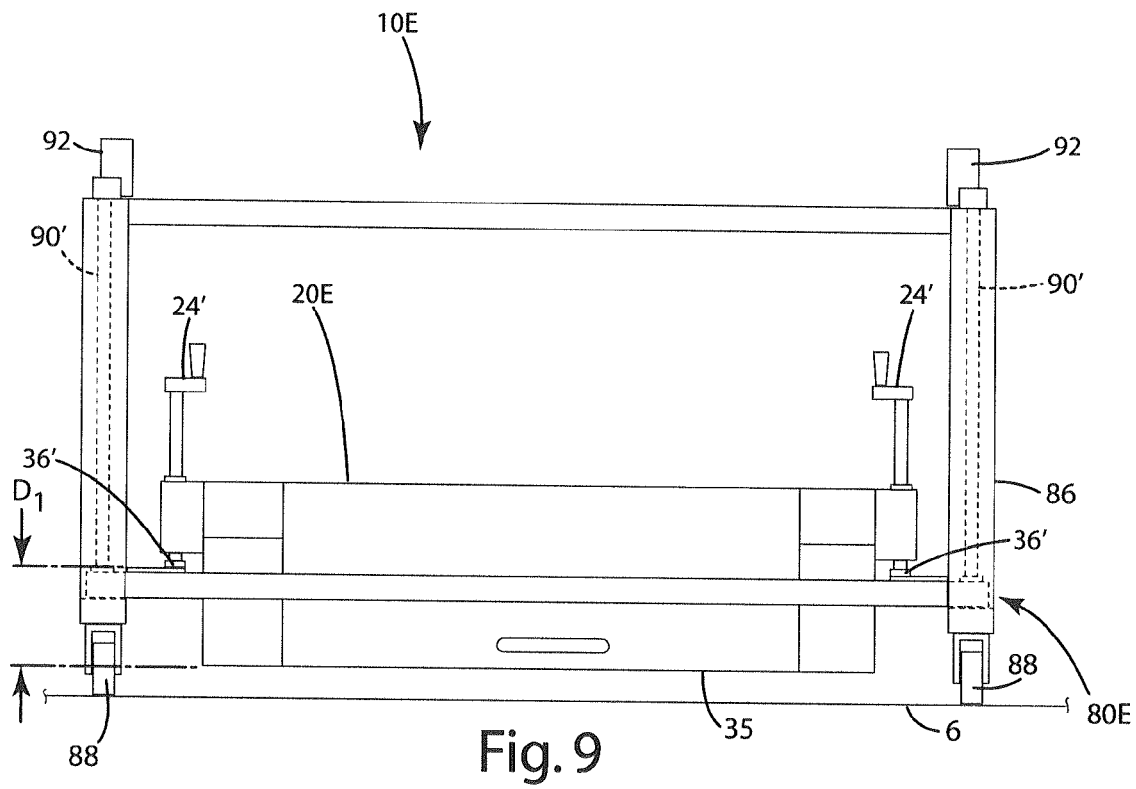
FIG. 9 is a front view of the enclosure and cart of FIG. 8 with the enclosure illustrated in a lower position as compared to FIG. 8.

FIG. 8 illustrates the alternate embodiment 10E wherein the enclosure 20E may be disposed on an alternate embodiment of a cart 80E. In this configuration, the enclosure 20E may be disposed such that the bottom surface 35 of the enclosure may be adjusted to be lower than (e.g., below) feet 36' of adjustment devices 24'. In this manner, the enclosure 20E, and more particularly bottom surface 35, is infinitely positionable between a range of from, above a top surface 82 of cart 80E, to a distance D1 (FIG. 9) below feet 36'. As such, bottom 35 of enclosure 20E is able to be disposed directly adjacent to a surface 6. For example, as illustrated in FIG. 9, the bottom surface 35 of enclosure 20E may be lowered to a surface 6 which may be the floor upon which the cart 80E resides. Still further yet, if the particular end user requirements dictate, the bottom surface 35 could be lowered to a position below surface 6, and for example only, into a pit or other surface below the floor surface. Accordingly, the engraving system of the present invention is operable upon a work piece 2 that is disposed above, on, or even below a floor surface. Further, the engraving system may be operably positioned to engrave the floor surface itself. Although not illustrated, the engraving device 40 may also be adjustable within the enclosure (e.g., height adjustable) in any known manner.

Also illustrated in FIGS. 8-9 are cart adjustment devices 90' which, for example only, may comprise worm gears. Although these adjustment devices 90' may be manually operated, in the illustrated example the devices are operably connected to one or more motors 92 for automated adjustment. The automated adjustment of adjustment devices 90' may be controlled for example, from one or more controllers disposed within enclosure 20E. In this manner, the controller within enclosure 20E may be connected (in any known manner) to cart 80E whereby the one or more controllers operably adjust motors 92, thereby adjusting enclosure 20E for proper operational height. Of course, the adjustment devices 24' of the enclosure 20E may also be motorized and automated in a similar manner, thereby allowing the enclosure 20E and the cart 80E to be controlled and operably adjusted by the one or more controllers.

Figure 10:
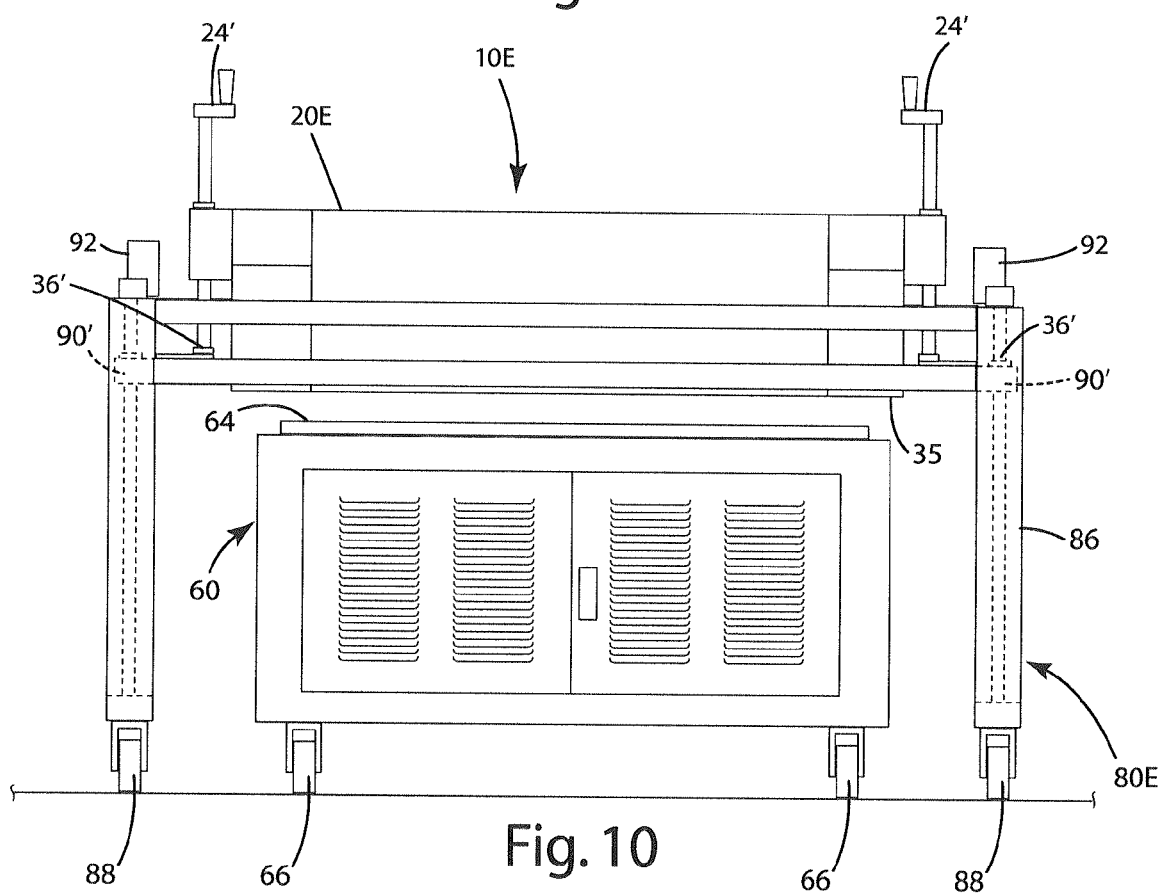
FIG. 10 is a perspective view of the enclosure and cart of FIG. 8, in use with the base of the portable engraving system of the present invention.

FIG. 10 illustrates the enclosure 20E and cart 80E of FIG. 9 used in conjunction with the base 60 as described herein above. In this configuration, and for example only, the platform 64 of base 60 is also adjustable (e.g., in height) and further, is also adapted to be operably connected to the one or more controllers of enclosure 20E, whereby the controller acts to adjust the platform 64 according the particular requirements of the work piece. Further, when used in conjunction with cart 80E, the same controller may be connected to motors 92 for operable adjustment thereof. As such, the one or more controllers of enclosure 20E may be connected to and adjust, either alone or in any combination thereof, the enclosure 20E, the cart 80E, and the base 60, thereby arriving at a fully adjustable system with maximum adjustability and flexibility. In this manner the same controller can be utilized to adjust the platform 64, the adjustment devices 90', and the adjustment devices 24' (if so equipped) according to the particular requirements of the end user. Of course, the system may also be configured to be connectable to each of the described systems, separately. For example, a connector may be provided such that the same connector may be used to connect either the cart 80E when used, or the base 60 when used. In this manner, the enclosure is able to be disposed on either system, connected thereto, and is fully adjustable via the controller in the enclosure in a simple "plug and play" manner (e.g., without requiring additional manual configuration).

Figure 11:
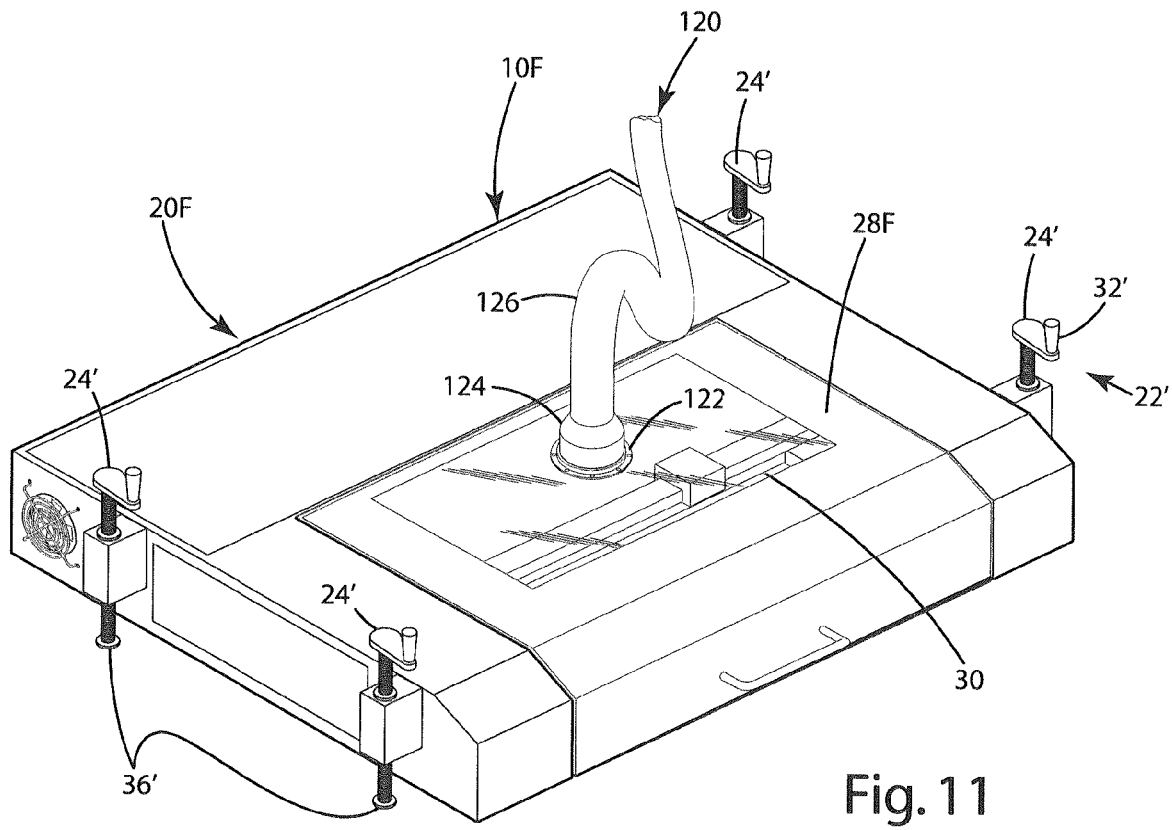
FIG. 11 is a perspective view of an embodiment of an enclosure of the portable engraving system of the present invention with a venting system attached thereto.

FIG. 11 illustrates yet another embodiment 10F of a portable enclosure 20F which includes a vent system 120. Vent system 120 may further comprise a vent 122, an adapter 124, and a hose 126 which may be connected to an externally powered venting source. In this manner, the system 10F allows for venting from a top surface 34. As such, for example, when the enclosure 20F is used alone or with cart 80, the vent system 120 allows the system 10F to be vented for optimal operation.

Figure 12:
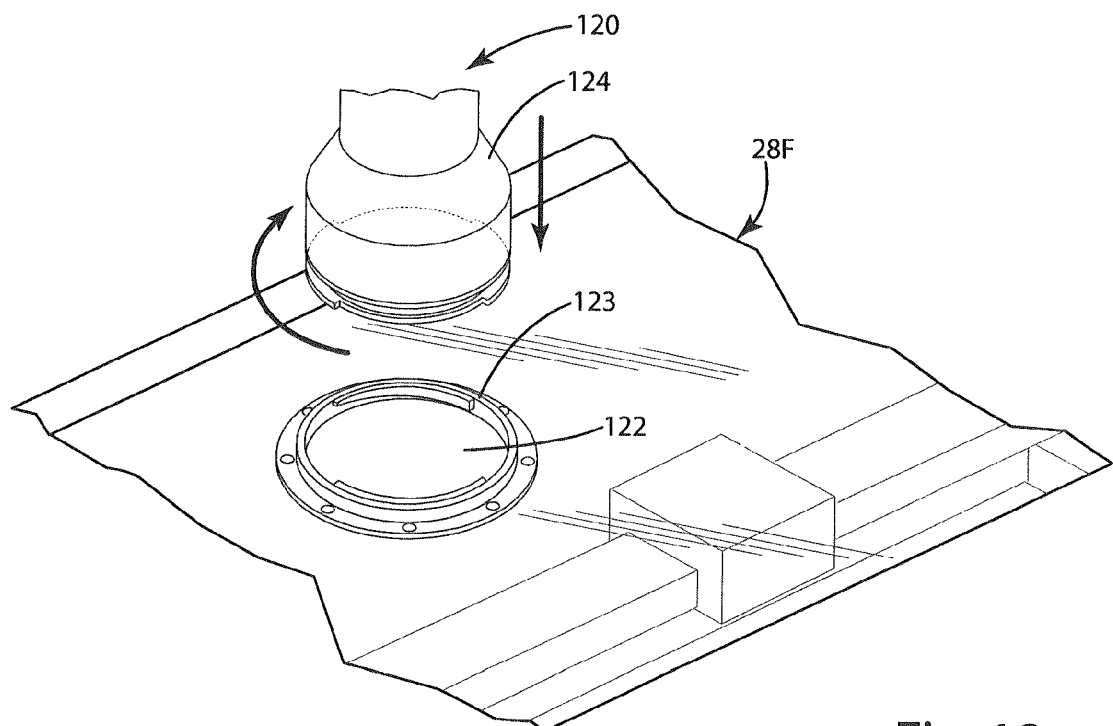
FIG. 12 is an enlarged fragmentary view of the venting system of FIG. 11, illustrating the venting system being connected to the enclosure.
Figure 13:
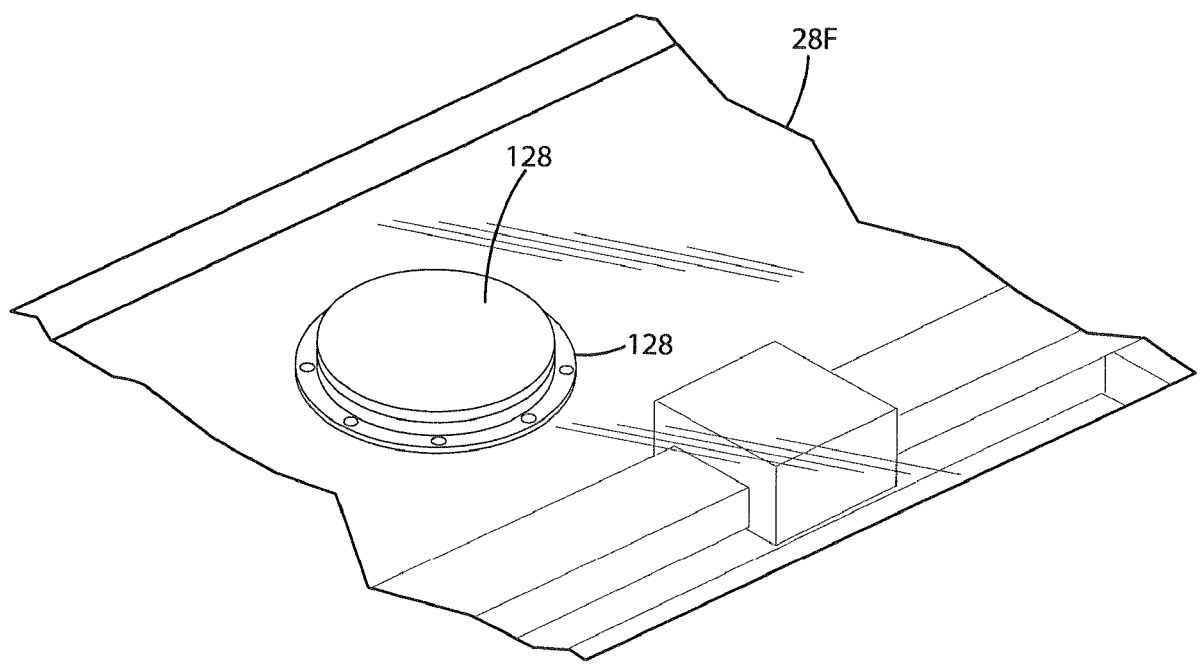
FIG. 13 is an enlarged fragmentary view of the enclosure with the venting system removed and the vent closed.

FIG. 12 illustrates that the vent system 120 may be disposed within the cover 28F, for example in window 30 and further, may be removable therefrom. In this configuration, a vent 122 is provided in window 30 and may further comprise an adapter 123. Adapter 123 is configured to removably connect to adapter 124. This removable connection may comprise any known method. For example only, as illustrated, the removable connection may comprise a screw or "twist and lock" style connection. In this manner, and when desired, an external venting source may be connected to the enclosure 20F for venting the dust and debris generated during the engraving process. As best illustrated in FIG. 13, again as desired, the external venting source may be disconnected from the enclosure 20F and sealed or capped through the use of a cap or top 128, when venting is not desired or unavailable. Of course, an external venting source may be remotely connected to vent 122 through the hose 126 or, it is envisioned that a powered vent may be directly and removable connected to vent adapter 123, wherein the powered vent would have a similar mating and removable connection.

Enclosure 20, base 60, and cart 80 may be used individually or in any combination with one another to perform as described herein. For example only, and in a non-limiting manner: enclosure 20 and base 60 may be used together to achieve a portable engraving system having venting capability; alternatively, enclosure 20 and cart 80 may be utilized to engrave a large work piece or a work piece having irregular features, without requiring the customary manipulation of the work piece that is now necessary; Still further, enclosure 20 comprising the vent system, used with or without cart 80 may be used to achieve a portable engraving system having venting capability; additionally, enclosure 20, base 60, and cart 80 can be used together in order to achieve all of the benefits described herein.

Advantageously, a novel portable engraving system has been invented that can be used on-site or off-site; the system can accommodate small or large work pieces; and the system has the ability to engrave unusual work pieces such as floors, ceilings, large and small monuments, even monuments that have been previously erected (e.g., the system can be transported to the site of the monument, attached to the monument in any known manner and in any location thereon, and engraving can thereby be achieved).

The solutions offered by the invention disclosed herein have thus been attained in an economical, practical, and facile manner. To wit, a novel engraving system which is portable, versatile, cost effective, and easily used has been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. A portable engraving system comprising:
    an enclosure adapted to operably accommodate an engraving device;

the enclosure comprising an adjustment system, the adjustment system comprising one or more adjustable devices, the adjustable devices adapted to adjust a distance between the enclosure and a work surface thereby allowing adjustment of the distance between the enclosure and the work surface, whereby the enclosure is adjustable with respect to the work surface;

the enclosure further comprising an opening, wherein the engraving device is operably positioned thereto, whereby the work surface is accessible to the engraving device therethrough; and wherein the enclosure is positionable adjacent the work surface and operably disposed thereto.

2. The portable engraving system of claim 1, wherein:
the one or more adjustable devices further comprise a distal end, and are operably disposed on the enclosure so as to allow a bottom surface of the enclosure to extend below the distal end of the one or more adjustable devices.

3. The portable engraving system of claim 1, wherein:
the adjustment system is adapted to adjust a height of the enclosure.

4. The portable engraving system of claim 1, wherein:
the adjustment system is adapted to adjust an angle of the enclosure.

5. The portable engraving system of claim 1, wherein:
the adjustment system comprises at least three adjustable devices, thereby allowing adjustment of the distance and angle between the enclosure and the work surface at each of the at least three adjustable devices.

6. The portable engraving system of claim 1, wherein:
the adjustment system comprises four independently adjustable worm drives, thereby allowing adjustment of the distance and angle between the enclosure and the work surface.

7. The portable engraving system of claim 1, wherein:
the engraving device comprises a laser.

8. The portable engraving system of claim 1, wherein:
the enclosure further comprises an exhaust system.

9. The portable engraving system of claim 8, wherein:
the exhaust system is disposed on a top of the enclosure.

10. The portable engraving system of claim 1, further comprising:
a portable base, the base adapted to retain the work surface.

11. The portable engraving system of claim 10, the base further comprising:
an exhaust system.

12. The portable engraving system of claim 10, wherein:
the base is adapted to removably receive the enclosure.

13. The portable engraving system of claim 1, further comprising:
a portable cart adapted to receive the enclosure;
wherein the portable cart is adapted to be positionable over the work surface and positions the enclosure adjacent the work surface.

14. The portable engraving system of claim 13, wherein:
the cart comprises a second adjustment system, the second adjustment system comprising one or more adjustable devices, the adjustable devices adapted to adjust a distance between the enclosure and the work surface.

15. A portable engraving system comprising:
a portable enclosure adapted to operably accommodate an engraving device;
the enclosure comprising an adjustment system, the adjustment system comprising one or more adjustable devices, the adjustable devices adapted to adjust a distance between the enclosure and a work surface of a work piece thereby allowing adjustment of the distance between the enclosure and the work surface whereby the enclosure is adjustable with respect to the work surface;
the enclosure further comprising an opening, wherein the engraving device is operably positioned thereto, whereby the work surface is accessible to the engraving device therethrough;
a portable base comprising an exhaust system, the base adapted to removably receive the portable enclosure and further comprising a holder adapted to retain the work piece;
wherein when the enclosure is removably positioned on the base, the enclosure is disposed adjacent the holder.

16. The portable engraving system of claim 15, wherein:
the adjustment system is adapted to adjust a height of the enclosure.

17. The portable engraving system of claim 15, wherein:
the adjustment system is adapted to adjust an angle of the enclosure.

18. The portable engraving system of claim 15, wherein:
the adjustment system comprises at least two adjustable devices, thereby allowing adjustment of the distance and an angle between the enclosure and the work surface.

19. The portable engraving system of claim 15, wherein:
the engraving device comprises a laser.

20. The portable engraving system of claim 15, wherein:
the enclosure comprises an exhaust system.

21. The portable engraving system of claim 15, further comprising:
a portable cart adapted to be disposed adjacent the work piece.

22. The portable engraving system of claim 21, wherein:
the portable cart is adapted to removably receive the enclosure, wherein the cart is adapted to be positionable over the work piece and positions the enclosure adjacent the work surface.

23. The portable engraving system of claim 22, wherein:
the cart comprises a second adjustment system, the second adjustment system comprising one or more adjustable devices, the adjustable devices adapted to adjust a distance between the enclosure and the work surface.

24. A portable engraving system comprising:
a portable enclosure adapted to operably accommodate an engraving device;
the enclosure comprising an adjustment system, the adjustment system comprising one or more adjustable devices, the adjustable devices adapted to adjust a space between the enclosure and a work surface of a work piece thereby allowing adjustment of the space between the enclosure and the work surface;
the enclosure further comprising an opening, wherein the engraving device is operably positioned thereto, whereby the work surface is accessible to the engraving device therethrough; and
a portable cart adapted to removably receive the portable enclosure, wherein the cart is adapted to be positionable over the work piece and positions the enclosure adjacent the work surface.

25. The portable engraving system of claim 24, wherein:
the adjustment system comprises four independently adjustable worm drives, thereby allowing adjustment of the distance and an angle between the enclosure and the work surface.

26. The portable engraving system of claim 24, wherein:
the enclosure comprises an exhaust system.

27. The portable engraving system of claim 24, further comprising:
a portable base, the base adapted to retain the work piece.

28. The portable engraving system of claim 27, the base further comprising:
an exhaust system.

29. The portable engraving system of claim 28, wherein: the base is adapted to removably receive the enclosure.

30. The portable engraving system of claim 24, wherein: the cart comprises a second adjustment system, the second adjustment system comprising one or more adjustable devices, the adjustable devices adapted to adjust a distance between the cart and the work surface.

31. A portable laser engraving system comprising:
a portable enclosure adapted to operably accommodate a laser engraving device;
the enclosure comprising an adjustment system, the adjustment system adapted to adjust a space between the enclosure and a work surface of a work piece thereby allowing adjustment of the space between the enclosure and the work surface;
the enclosure further comprising an opening, wherein the engraving device is operably positioned thereto, whereby the work surface is accessible to the engraving device therethrough;
a portable cart adapted to removably receive the portable enclosure, wherein the cart is adapted to be positionable over the work piece and positions the enclosure adjacent the work surface; and
a portable base comprising an exhaust vent, the base adapted to removably receive the portable enclosure and further adapted to retain the work piece;
whereby the portable enclosure is adapted to be disposed on one of the portable cart and the portable base.

32. The portable engraving system of claim 31, wherein: the adjustment system is adapted to adjust a distance of the enclosure with respect to the work surface.

33. The portable engraving system of claim 31, wherein: the adjustment system is adapted to adjust an angle of the enclosure with respect to the work surface.

34. The portable engraving system of claim 31, wherein: the adjustment system comprises at least three adjustable devices, thereby allowing adjustment of the distance and angle between the enclosure and the work surface at each of the at least three adjustable devices.

35. The portable engraving system of claim 31, wherein: the adjustment system comprises four independently adjustable worm drives, thereby allowing adjustment of the distance and angle between the enclosure and the work surface.

36. The portable engraving system of claim 31, wherein: the enclosure comprises an exhaust system.

37. The portable engraving system of claim 31, wherein: the cart comprises a second adjustment system, the second adjustment system comprising one or more vertically adjustable devices, the adjustable devices adapted to adjust a distance between the cart and the work surface.

38. A portable laser engraving system comprising:
a portable enclosure adapted to operably accommodate a laser engraving device;
the enclosure comprising an adjustment system, the adjustment system comprising one or more independently adjustable devices, the adjustable devices adapted to independently adjust a distance between the enclosure and a work surface of a work piece thereby allowing adjustment of the distance and angle between the enclosure and the work surface, whereby the enclosure is adjustable with respect to the work surface; and
the enclosure further comprising an opening, wherein the engraving device is operably positioned thereto, whereby the work surface is accessible to the engraving device therethrough.

39. The portable engraving system of claim 38, wherein: the adjustment system comprises four independently adjustable worm drives, thereby allowing adjustment of the distance and angle between the enclosure and the work surface.

40. The portable engraving system of claim 39, wherein: the enclosure comprises an exhaust system.

41. The portable engraving system of claim 38, further comprising:
a portable cart adapted to receive the enclosure, wherein the cart is adapted to be positionable over the work piece and positions the enclosure relative to the work surface.

42. The portable engraving system of claim 41, wherein: the cart comprises a second adjustment system, the second adjustment system comprising one or more vertically adjustable devices, the adjustable devices adapted to adjust a distance between the enclosure and the work surface.

43. The portable engraving system of claim 38, further comprising:
a portable base, the base further comprising an exhaust system, wherein the base is adapted to removably receive the enclosure.

44. A portable laser engraving system comprising:
a portable enclosure adapted to operably accommodate a laser engraving device;
the enclosure comprising an adjustment system, the adjustment system comprising four independently adjustable worm drives, thereby allowing adjustment of the distance and angle between the enclosure and a work surface, whereby the enclosure is adjustable with respect to the work surface;
the enclosure further comprising an opening, wherein the engraving device is operably positioned thereto, whereby the work surface is accessible to the engraving device therethrough;
the enclosure further comprising an exhaust system disposed on a top thereof;
a portable cart adapted to removably receive the portable enclosure, wherein the cart is adapted to be positionable over the work piece and positions the enclosure adjacent the work surface;
the cart comprising a second adjustment system comprising one or more vertically adjustable devices, the adjustable devices adapted to adjust a distance between the cart and the work surface; and
a portable base comprising an exhaust vent, the base adapted to removably receive the portable enclosure and further adapted to retain the work piece;
whereby the portable enclosure is adapted to be disposed on one of the portable cart and the portable base.

45. A portable engraving system comprising:
A portable enclosure adapted to operably accommodate an engraving device;
the enclosure comprising an adjustment system, the adjustment system comprising one or more adjustable devices disposed on respective one or more outside surfaces of the enclosure, the adjustable devices adapted to adjust a space between the enclosure and a work surface thereby allowing adjustment of the space between the enclosure and the work surface;
the enclosure further comprising an exhaust system;

wherein the enclosure is positionable adjacent the work surface and adjustably disposed thereto.

46. The portable engraving system of claim 45, wherein:
The adjustment system of the enclosure is motorized and controlled by a controller disposed within the enclosure.

47. The portable engraving system of claim 46, further comprising:
a portable cart adapted to receive the enclosure wherein the cart is adapted to be positionable over the work piece and positions the enclosure relative to the work surface;
the cart comprising a second adjustment system, the second adjustment system comprising one or more vertically adjustable devices, the adjustable devices adapted to adjust a distance between the enclosure and the work surface.

48. The portable engraving system of claim 47, wherein:
The second adjustment system of the cart is motorized.

49. The portable engraving system of claim 48, wherein:
The controller is adapted for operable connection with the second adjustment system for control and operation thereof.

* * * * *